Feb. 7, 1928. 1,658,441
J. R. HEMEON
CONNECTIVE DEVICE FOR FLEXIBLE COUPLINGS
Filed Dec. 28, 1926

JAMES RUSSELL HEMEON.
INVENTOR

ATTORNEY

Patented Feb. 7, 1928.

1,658,441

UNITED STATES PATENT OFFICE.

JAMES RUSSELL HEMEON, OF NORTH PLAINFIELD, NEW JERSEY.

CONNECTIVE DEVICE FOR FLEXIBLE COUPLINGS.

Application filed December 28, 1926. Serial No. 157,508.

My invention relates to improvements in connective devices used to connect flexible disks to spiders or the like in flexible couplings which are employed for transmitting motion between shafts or other rotating object the angle between which may be at all times variable and has for its object to produce a device that will so co-act with the disk that the life of the latter is materially lengthened in service.

A further object is to produce a device that is so simple in construction that it may be simply cast; thereby producing a cheap and effective device. The saving resulting in the present construction by eliminating the machine work involved in its construction, is further increased in saving by virtue of the increased life of the disk and the facility with which the coupling may be assembled. The foregoing and other features of my invention will now be described in connection with the accompanying drawing forming part of this specification in which I have represented my connective device in its preferred form, after which I shall point out more particularly in the claims these features which I believe to be new and of my own invention.

Figure 1:
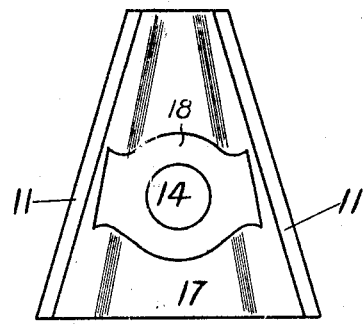
Figure 1 is a plan view of my device.
Figure 2:
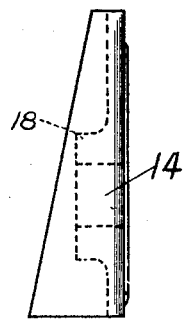
Figure 2 is a side elevation thereof.
Figure 3:
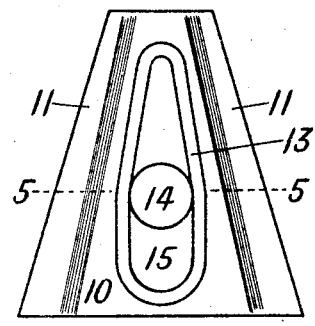
Figure 3 is a plan view showing the opposite side from that shown in Figure 1.
Figure 4:
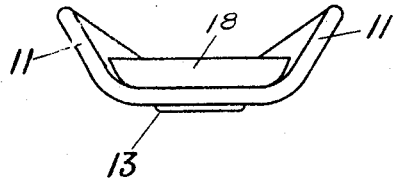
Figure 4 is an end view thereof.
Figure 5:
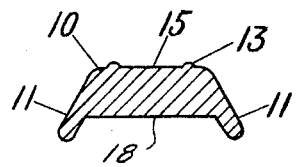
Figure 5 is a section along the line 5—5 Fig. 3.

My device may be preferably made of malleable iron or cast or moulded or forged as may be desirable and comprises a trapezoidal shape, member 10 having two side wings 11 converging with the vertical at an angle, which may vary from 20° to 40° depending on the angularity of the coupling on which the connective devices are used.

On the face of the device designed to go next to the torque transmission device or disk I employ a beaded member 13 integral therewith and marginally located. A hole 14 is provided to accommodate a bolt or other fastening means common to flexible coupling assemblies. It will be observed that the surface 15 is plain within the beaded margin 13. This is an important feature because with that construction the disk (not shown) is withheld from working out from under the bead which is clamped tightly into the body thereof.

On the back of the device 17 I provide a boss or thickened portion 18 through which the hole 14 passes.

I wish it distinctly understood that my connective device herein described and illustrated is in the form in which I desire to construct it but that changes or variations may be made as may be convenient or desirable without departing from the salient features of my invention and I therefore intend the following claims to cover such modifications as naturally fall within the lines of invention.

I claim:

1. A connective device for a flexible torque transmission device comprising a winged washer one face of which is trapezoidal in shape and provided with a boss on the opposite face, and a hole extending through the face and boss.

2. A connective device as specified in claim 1 in which the angles of the wings to the vertical may be from 20° to 40°.

3. A connective device as specified in claim 1 in which the face of the washer is marginally beaded but substantially plain within its beaded margin.

4. A connective device as specified in claim 1 in which the face of the washer is laterally ridged at its margin, but otherwise substantially plain, the margin of the washer being well removed from the hole therein.

Dated this 21st day of December 1926.

JAMES RUSSELL HEMEON.